United States Patent Office 3,467,685
Patented Sept. 16, 1969

3,467,685
PREPARATION OF ORGANOSILOXANES BY THE REACTION OF ORGANOSILICON HYDRIDES WITH ORGANOSILANOLS
Gérard Milbert and Georges Pagni, Lyon, France, assignors to Rhone-Poulenc S.A.
No Drawing. Filed Feb. 4, 1966, Ser. No. 525,146
Claims priority, application France, Feb. 4, 1965, 4,428, Patent 1,452,005; Jan. 12, 1966, 45,711, Patent 1,473,990
Int. Cl. C07f 7/18; C08g 51/50, 47/00
U.S. Cl. 260—448.2                                    7 Claims

ABSTRACT OF THE DISCLOSURE

Hydroxylamine and substituted hydroxylamines are valuable catalysts in the reaction of compounds containing hydrogen attached to silicon with organosilanols. The products are useful, inter alia, as plasticizers in organosiloxane compositions.

---

The present invention relates to the preparation of organosiloxanes, and to certain new organosiloxanes so obtained.

It is known to condense organosilanes containing Si—H bonds with organosilanols, the operation being carried out in the presence of colloidal nickel. This catalytic dehydrocondensation may be diagrammatically represented as follows:

This process is entirely satisfactory when applied to the preparation of relatively low molecular weight organosiloxanes which can be purified, for example, by simple distillation. On the other hand, the process is unsuitable for the preparation of organopolysiloxanes of high molecular weight, such as oils, gums, elastomers or resins, because it becomes very difficult, if not impossible, to eliminate the metal catalyst from the viscous or solid product obtained, and the presence of this catalyst may then be harmful to the stability of the products or to their subsequent use.

It has now been found that the dehydrocondensation of compounds containing silicon-hydrogen bonds and organosilanols also be catalysed by hydroxylamine or an N-substituted hydroxylamine.

The process of the invention for the preparation of an organosiloxane therefore comprises reacting a compound containing a siliconhydrogen bond with an organosilanol in the presence of, as catalyst, hydroxylamine or an N-substituted hydroxylamine.

The process may be carried out with all types of organosilicon compounds having

and

groupings respectively. It is thus possible to use organosilicon compounds having one or more silicon-hydrogen bonds, for example monosilanes, polysilanes, polysilylalkanes, polysiloxanes or organocyclopolysiloxanes. The hydrocarbon groups attached to the silicon atoms of these various organosilicon compounds can be very varied. They may be chosen more particularly from alkyl radicals of 1 to 4 carbon atoms, alkenyl radicals having only one double bond and of 2 to 4 carbon atoms, especially vinyl and allyl, saturated or monoethylenically unsaturated alicyclic radicals of 5 to 6 carbon atoms, such as cyclopentyl, cyclohexyl or cyclohexenyl, aryl radicals, more particularly phenyl and phenyl substituted by lower alkyl, e.g. tolyl, xylyl or cumenyl, and aralkyl radicals, more particularly phenylalkly radicals such as benzyl and phenylethyl. The silicon atoms of the organosilicon compounds may also comprise hydrocarbon groups substituted by halogen atoms or by functional groups; and the silicon atoms may themselves be attached to functional groups such as alkoxy or aryloxy groups. [The terms "lower alkyl" and "lower alkenyl" are used herein to refer to alkyl of 1 to 4 carbon atoms and alkenyl of 2 to 4 carbon atoms, respectively.] The symbols R and R' are used in the following description (except where otherwise indicated) to refer to substituents of the aforesaid types.

The following are examples of types of organosilicon compound containing silicon-hydrogen bonds, which may be employed in the process of the invention.

(1) Hydrogenomonosilanes of the formula:

$$(H)_a Si(R)_b (OR')_{4-a-b} \qquad (I)$$

in which R and R' are as previously defined, $a$ is 1, 2 or 3, and $b$ is 0, 1, 2 or 3, $a+b$ being at most equal to 4. Of these compounds the alkylhydrogenosilanes, the alkoxyhydrogenosilanes, and the alkylalkoxyhydrogenosilanes may be particularly mentioned. Specific examples of such compounds are trimethylsilane, methyldiphenylsilane, methyldimethoxysilane, methyldiethoxysilane, ethyldimethoxysilane, phenyldiethoxysilane, and triethoxysilane.

(2) Disilanes such as, for example, the compounds of the formula:

$$(H)_a (R)_{3-a} Si-Si(H)_c (R')_{3-c} \qquad (II)$$

in which R and R' are as previously defined, and $a$ and $c$ may each be equal to 1, 2 or 3.

(3) Polysilylalkanes such as those of the formule:

$$(H)_a (R)_{3-a} Si-(CH_2)_d-Si(H)_c (R')_{3-c} \qquad (III)$$

in which R, R', $a$ and $c$ are as previously defined, and $d$ represents an integer.

(4) Linear polysiloxanes, which may be either (a) of low molecular weight, such as the compounds of the formula:

$$(H)_a (R)_{3-a} Si-O-Si(H)_c (R')_{3-c} \qquad (IV)$$

in which R, R', $a$ and $c$ are as previously defined, or (b) of medium or high molecular weight, including, more particularly, (i) the compounds of the formula:

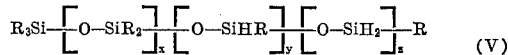

in which the R symbols are identical or different and represent hydrocarbon groupings as defined above, and $x$, $y$ and $z$ represent integers, it is also being possible for one of $y$ and $z$ to be zero and for the various siloxane units to be distributed randomly in the molecular chain; and (ii) the compounds of the formula:

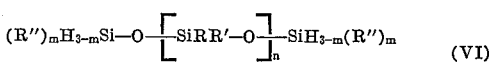

in which R, R' and R" are identical or different and represent optionally substituted monovalent hydrocarbon radicals as defined above, $m$ is 1 or 2, and $n$ represents an integer. Such compounds in which $m$ is 1 may be prepared as described in French Patent No. 1,404,561.

(5) Cyclic polyorganopolysiloxanes such as, for example, 1,3,5-trimethyltrihydrogenocyclotrisiloxane, 1,3,5, 7 - tetramethyltetrahydrogenocyclotetrasiloxane, 1,3,5,7,9-pentamethylpentahydrogenocyclopentasiloxane, 1,3,5-triphenyltriihydrogenocyclotrisiloxane.

(6) Branched polysiloxanes which may be homopolymers or copolymers containing silicon-hydrogen bonds. These may be, for example, hydrolysates of trifunctional silanes or cohydrolysates of trifunctional silanes and bifunctional silanes.

Compounds of Formula VI in which each of R, R' and R" is lower alkyl, lower alkenyl, or phenyl are especially valuable starting materials in the process of the invention.

The organosilanols (i.e., compounds having hydroxyl groupings directly attached to silicon atoms) used in the process of the invention may comprise one or more hydroxyl-silicon bonds involving one or more silicon atoms. When the compounds contain a plurality of silicon atoms, they may be derivatives of polysilanes, polysilylalkanes or polysiloxanes. By way of example, the following may be mentioned: silanols, such as trimethylsilanol, dichloromethyldimethylsilanol, triethylsilanol, tripropylsilanol, tricylohexylsilanol, triphenylsilanol, methyldiphenylsilanol, trinaphthylsilanol, and triphenylsilyldiphenylsilanol; silanediols such as diphenylsilanediol, methylphenylsilanediol, dimethylsilanediol, diethylsilanediol, diallylsilanediol, dicylcohexylsilanediol, vinylbenzylsilanediol, and bis(trimethylsilylmethyl)silanediol; phenylsilanetriol; disiloxanediols such as symmetrical tetramethyldisiloxanediol and symmetrical dimethyldicyclohexyldisiloxanediol; and $\alpha,\omega$-dihydroxylated polysiloxanes, more particularly those of the formula:

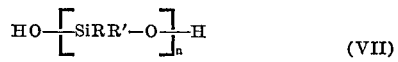

(VII)

in which R and R are identical or different and represent monovalent hydrocarbon radicals as previously defined, and $n$ represents an integer, it being possible for some of the radicals R and R' to represent hydrogen, provided however that the proportion of hydrogen atoms to the total number of radicals R and R' is low, and generally below 10%. The compounds of formula VII in which R and R' are each lower alkyl, lower alkenyl, or phenyl are especially valuable starting materials in the process of the invention.

The catalyst employed may be a hydroxylamine of the formula:

$$R^1R^2NOH \qquad (VIII)$$

in which the symbols $R^1$ and $R^2$ are identical or different and represent hydrogen atoms or monovalent hydrocarbon radicals, $R^1$ and $R^2$ being optionally joined to form a heterocyclic radical. It is particularly suitable to use as catalyst hydroxylamine itself or an N-alkylhydroxylamine or an N,N-dialkylhydroxylamine, and, of these alkylhydroxylamines, more particularly the alkylhydroxylamines containing lower alkyl groups, such as methyl, ethyl or propyl. N,N-diethylhydroxylamine is a preferred catalyst.

To carry out the reaction, the reactants and the catalyst are mixed and brought to the appropriate temperature. If one of the reactants is too volatile, cooling is necessary, and one of the reactants is preferably gradually added to a mixture of the other reactant and the catalyst. Depending on the reactivity of the compounds and their volatility, it is possible to carry out the operation without application of heat with the reactants at ambient temperature (20° C.) or with cooling, at least initially, or with heating, at least at the end of the reaction. The optimum operating conditions for each particular case may readily be found by preliminary experiment. Generally, speaking, the optimum temperature varies for each specific case, and lies within the range −10° C. to +150° C.

The proportion of catalyst employed for carrying out the reaction is generally between 0.05% and 10% of the total weight of the organosilicon compounds employed, but the preferred percentage is from 0.1% to 5%.

The reaction may be carried out with or without diluent to modify the boiling point or the homogeneity of the reaction medium. For this purpose, ethers or aliphatic or aromatic hydrocarbons, whether halogenated or not, are quite suitable.

The proportions of the various organosilicon starting materials employed depend upon the desired result. Generally the quantities are such that the number of OH groups attached to silicon atoms and the number of silicon-hydrogen bonds correspond exactly to one another. It is also possible to use one of the reactants in a quantity such that an excess of silicon-hydrogen bonds or of hydroxyl-silicon groups is present, if it is desired to obtain a final product still containing either silicon-hydrogen bonds or hydroxyl-silicon groups respectively.

Since the reaction is accompanied only by evolution of hydrogen, the only product which has to be separated from the reaction medium is the hydroxylamine catalyst employed, which can readily be eliminated by heating in vacuo the product obtained. However, the presence of a small quantity of this latter substance is generally of little inconvenience in the applications for which the silicon compound obtained is to be used, and it therefore follows that the latter may often be employed as it is.

The process according to the present invention makes it possible to prepare organosilicon compounds having a wide range of structures. For example, polysiloxane oils and gums of predetermined chain length may be prepared. The new process is particularly useful for the preparation of $\alpha,\omega$-dihydroxypolysiloxane oils and gums whose molecular weight has previously been fixed in a very limited range. By this process, a polycondensation may be effected between an $\alpha,\omega$-dihydroxyorganopolysiloxane of low molecular weight, containing less than 25 silicon atoms, with a dihydrogenopolysiloxane, in proportions determined by the molecular weight of the polysiloxane which it is desired to prepare. The $\alpha,\omega$-dihydroxyorganopolysiloxanes of low molecular weight may themselves be readily prepared, for example, from organodiacyloxysilanes.

It is also possible to prepare by the new process organosilicon elastomers endowed with good mechanical properties from $\alpha,\omega$-dihydroxyorganopolysiloxane oils or gums and a cross-linking agent possessing Si—H bonds. As cross-linking agent, there may be employed, for example, a tetrahydrogenated compound such as one of the compounds of Formula II, III, IV, or VI.

Another preferred group of compounds which may be prepared by the new process are the compounds of the formula:

$$R'(RO)_2Si\text{—}O\text{—}Si(C_6H_5)_2\text{—}O\text{—}Si(OR)_2R' \qquad (IX)$$

in which R is lower alkyl and R' is lower alkyl or phenyl.

These new siloxanes are very reactive compounds which may be employed as crosslinking agents in cmpositions based on $\alpha,\omega$-dihydroxydiorganopolysiloxanes which are vulcanisable in the cold or which may be copolymerised with various other organosilicon monomers to give oils or resins. Moreover, the new siloxanes may with advantage be employed as plasticisers in compositions vulcanisable at elevated temperature which are based upon diorganopolysiloxane gums.

Organopolysiloxanes formed mainly of linear polysiloxane molecules in which the number of units —(R)$_2$SiO— is relatively high and having at each chain end two organoxy groups, for example alkoxy groups, attached to a silicon atom, are converted into elastic solids by the action of water in the presence of catalysts. Organopolysiloxanes of this type are described, for example, in French Patent No. 1,330,623.

Mixtures of diorganopolysiloxane gums and finely divided silica in which the particles have dimensions of the order of 10 to 30 m$\mu$, which are employed for the preparation of silicone elastomers, have good mechanical properties, but with the disadvantage that they are difficult to work and shape. The stiffening of such compositions may be appreciably reduced by the addition of compounds called plasticisers or antistructure agents. More particularly, the compounds of the formula:

$$A_nSiA'_{4-n} \qquad (X)$$

in which A represents a hydrocarbon radical and A a functional group such as for example OH or OA, may be employed for this purpose. The compounds of Formula X may be used as monomers or in more or less condensed form such as, for example:

AO(A)₂Si—O—Si(A)₂OA    (XI)

Compounds of this type form the subject of French Patent No. 1,111,969. The compounds of Formula IX may be used in organopolysiloxane compositions of the aforesaid types as plasticisers or antistructure agents.

While the new siloxanes are essentially compounds of Formula IX in a particular compound, there may be apart from the molecules of Formula IX, depending upon the process employed and the conditions of preparation, a small proportion of more highly condensed molecules containing alkoxy groupings dispersed along the molecule chain, for example molecules of the formulae:

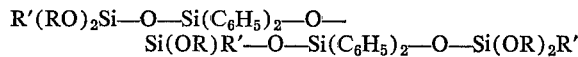
R'(RO)₂Si—O—Si(C₆H₅)₂—O—
   Si(OR)R'—O—Si(C₆H₅)₂—O—Si(OR)₂R' and

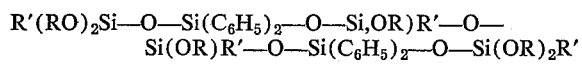
R'(RO)₂Si—O—Si(C₆H₅)₂—O—Si,OR)R'—O—
   Si(OR)R'—O—Si(C₆H₅)₂—O—Si(OR)₂R'

The siloxanes of Formula IX are prepared by reaction of diphenylsilanediol with a compound of the formula:

HSi(OR)₂R'    (XII)

where R and R' are as defined in connection with Formula IX, in the presence of, as catalyst, hydroxylamine or an N-substituted hydroxylamine. The general conditions under which this process is carried out are the same as those previously described.

Alternatively the siloxanes of Formula IX are prepared by reacting an alcohol of the formula ROH, in which R is as defined in connection with Formula IX, with a tetrahydrogenosiloxane of the general formula:

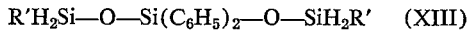
R'H₂Si—O—Si(C₆H₅)₂—O—SiH₂R'    (XIII)

in which R' is as defined in connection with Formula IX, in the presence of a catalyst. As catalyst, any condensation catalysts known for use in the condensation of Si—H groups with hydroxylated organic compounds may be used, e.g., an akali metal hydroxide or zinc chloride. Preferably, however, the catalyst is hydroxylamine or an N-substituted hydroxylamine such as N,N-diethylhydroxylamine, as described in French Patent No. 1,411,288. The process proceeds as follows:

4ROH+R'H₂Si—O—Si(C₆H₅)₂—O—SiH₂R'→
    R'(RO)₂Si—O—Si(C₆H₅)₂—O—Si(OR)₂R'+4H₂↑

This process is advantageous, since the operating conditions are very gentle and, at least under only anhydrous conditions, there are substantially no secondary reactions.

The reaction is advantageously carried out by adding the alcohol ROH to the mixture of compound of Formula XIII and catalyst, so that the evolution of hydrogen and the temperature of the medium may be more readily controlled. The proportion of catalyst may be from 0.1% to 10% of the weight of the compound of Formula XIII, and a proportion of 1% to 5% is generally very satisfactory. Generally, the operation is carried out at a relatively low temperature, for example between —5° C. and +25° C., but the condensation may be carried out with moderate heating if necessary. The reaction may be performed in the presence or absence of a liquid organic diluent. The proportions of reactants are preferably in the neighbourhood of 4 moles of the alcohol of formula ROH to 1 mole of the compound of Formula XIII, but a slight excess of the alcohol may be employed.

It is desirable to operate with well dried reactants in the absence of mosture and under a current of dry nitrogen. In the presence of moisture, secondary hydrolysis reactions may occur, more particularly hydrolysis of the desired product with the formation of condensed products. However, the presence of small proportions of such fortuitously formed products in the final product may be tolerated.

Where the reaction is carried out in a liquid organic diluent there may be employed for this purpose liquids such as benzene hydrocarbons and their halogenated derivatives, e.g., benzene, toluene, xylene or monochlorobenzene; petroleum ethers and white spirit; saturated aliphatic hydrocarbons; aliphatic ethers such as diethyl ether, dipropyl ethers and dibutyl ethers. A single diluent or a mixture of diluents may be employed. At the end of the reaction, it is sufficient to eliminate the diluent to obtain the product of Formula IX as such.

When it is desired to prepare compounds of Formula IX in which the R radicals are different, it is sufficient to use mixtures of alcohols of formula ROH, or mixtures of compounds of Formula XII.

The starting materials of Formula XIII may be prepared as described in French Patent No. 1,404,561, by the action of a monoorganomonohalogenosilane of the formula R'SiH₂Hal, in which R' is as previously defined and Hal represents a halogen atom, more particularly a chlorine atom, on diphenylsilanediol in the presence of a neutralising aegnt, preferably in a liquid organic diluent which is inert under the operating conditions, the operation being carried out at a temperature compatible with the volatility of methylchlorosilane. For example, monomethylchlorosilane cooled at —10° C. may be added to an organic diphenylsilanediol solution cooled at 0° C.

The starting material of formula XIII may also be prepared by hydrolysis of a mixture of diphenyldihalogenosilane and organomonohalogenosilane of the formula R'SiH₂Hal, more particularly a mixture of diphenyldichlorosilane and organomonochlorosilane:

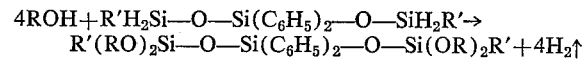
$$2R'SiH_2Hal + Si(C_6H_5)Hal_2 \xrightarrow{H_2O} R'H_2Si\text{-}O\text{-}Si(C_6H_5)_2\text{-}O\text{-}Si_2H_2R$$

Preferably, water is added to a mixture of the reactants in solution in an organic diluent which is inert under the operating conditions, for example diethyl ether. After hydrolysis, which takes place at low temperature or at ambient temperature and may be completed by moderate heating, the organic layer is decanted, washed and dried, and the diluent is then eliminated. The compound of Formula XIII remains.

The following examples illustrate the invention.

EXAMPLE 1

Into a 500 cc. round-bottomed flask provided with a stirrer and a dropping funnel 130 g. of anhydrous toluene and 81 g. of the polysiloxane of the formula:

H(CH₃)₂Si[OSi(CH₃)₂]₂OSi(CH₃)₂H are introduced. This solution is heated to 50° C., and a solution of 100 g. of the α,ω-dihydroxydimethylpolysiloxane oil of the formula:

HO(CH₃)₂Si[OSi(CH₃)₂]₂OSi(CH₃)₂OH and 5 g. of N,N-diethylhydroxylamine in 50 g. of toluene is then introduced with stirring in 2 hours. When the evolution of hydrogen has ceased, the absence of Si—H bonds in the mixture is checked, and the toluene and volatile products are removed by heating the mixture to 160° C. under reduced pressure (5 mm. Hg). 140 g. of an hydroxylated oil remain containing 0.25% by weight of hydroxyl groups and having a viscosity of 617 centistokes at 20° C.

EXAMPLE 2

Into a 250 cc. round-bottomed flask, 100 g. of α,ω-dihydroxydimethylpolysiloxane oil containing 0.35% by weight of hydroxyl groups and having a viscosity of 600 centistokes at 20° C., 3 g. of the polysiloxane of the formula:

$$H(CH_3)_2Si[OSi(CH_3)(CH=CH_2)]_2OSi(CH_3)_2H$$

50 g. of anhydrous toluene, and 3 g. of N,N-diethylhydroxylamine are introduced. The mixture is heated under reflux until the evolution of hydrogen ceases.

When the solvent and the volatile products have been eliminated, a gum is obtained having a viscosity of 4 million centipoises at 25° C. and crosslinkable to an elastomer with organic peroxides.

EXAMPLE 3

The operation is carried out as in Example 2 with the following compounds: 200 g. of α,ω-dihydroxydimethylpolysiloxane oil having a viscosity of 3200 centistokes at 20° C. and containing 0.2% by weight of hydroxyl groups; 3.5 g. of the dihydrogenopolysiloxane used in Example 2; 100 g. of toluene; and 2 g. of N,N-diethylhydroxylamine. A gum having a viscosity of 6 million centipoises at 25° C., is finally obtained crosslinkable to form an elastomer with organic peroxides.

EXAMPLE 4

In a 2-roll mixer, the following compounds are intimately mixed: 100 g. of α,ω-dihydroxydimethylpolysiloxane oil having a viscosity of 1 million centistokes at 20° C.; 0.8 g. of the tetrahydrogenopolysiloxane of the formula:

$$H_2(CH_3)Si[OSi(CH_3)_2]_{12}OSi(CH_3)H_2$$

containing 0.4% by weight of hydrogen groups and having a viscosity of 33 centistokes at 20° C.; 62.5 g. of silica of combustion having a large specific surface, to the surface of which organosilicon groups have previously been fixed by treatment at elevated temperature with octamethylcyclotetrasiloxane; and 0.1 g. of N,N-diethylhydroxylamine.

The mixture is then placed in moulds in a thickness of 2 mm., and brought to 125° C. under a pressure of 50 bars for 10 minutes. The sheets obtained are then heated for 3 hours at 150° C. in a ventilated oven, and then for 16 hours at 250° C. The elastomer obtained has the following mechanical properties:

| | Shore hardness A | Breaking Strength (kg./cm.²) | Elongation (percent) | Tearing Strength (kg./cm.) |
|---|---|---|---|---|
| After 3 hours at 150° C | 65 | 36.5 | 415 | 26 |
| After 16 hours at 250° C | 67 | 41 | 450 | 23 |

EXAMPLE 5

In a two-roll mixer the following compounds are malaxated: 100 g. of α,ω-dihydroxydimethylpolysiloxane gum having a viscosity of 11,200,000 centipoises at 25° C. and containing 0.05% by weight of hydroxyl groups; 0.4 g. of the tetrahydrogenopolysiloxane of the formula:

$$H_2(CH_3)Si[OSi(C_6H_5)_2]_2OSi(CH_3)H_2$$

62.5 g. of the silica of combustion having a large specific surface used in Example 4; and 0.1 g. of N,N-diethylhydroxylamine.

The mixture is moulded and treated as in Example 4 and an elastomer is obtained having the following mechanical properties:

| | Shore hardness A | Breaking Strength (kg./cm.²) | Elongation (percent) | Tearing Strength (kg./cm.) |
|---|---|---|---|---|
| After 3 hours at 150° C | 73 | 70 | 465 | 37 |
| After 16 hours at 250° C | 74 | 63 | 300 | 22 |

EXAMPLE 6

The reaction is carried out throughout under an hydrous nitrogen atmosphere and with dry reactants.

Into a 3-necked, 500 cc. round-bottomed flask equipped with a stirrer, a condenser and a supply funnel are introduced 200 g. of 1,1,5,5-tetrahydrogeno-1,5-dimethyl-3,3-diphenyltrisiloxane and 2 g. of N,N-diethylhydroxylamine. While the flask is externally cooled by a bath of water and ice so as to maintain the reaction mixture at about 5° C., 125 g. of methanol are added in 30 minutes with stirring. Immediately on introduction of the methanol into the flask, hydrogen is liberated. The stirring is continued until the evolution of hydrogen ceases, i.e., for 2 hours, 30 minutes after the end of the addition of the alcohol. It is found by titration that the Si—H bonds have completely disappeared. The excess of methanol and N,N-diethylhydroxylamine are eliminated in vacuo, and the residue in then fractionally distilled. 207 g. of a liquid, boiling at 153° C./0.8 mm. Hg, are obtained, having the following characteristics: $d_4^{20}=1.1148$, $n_D^{20}=1.4890$. Its analysis corresponds to 1,1,5,5-tetramethoxy-1,5-dimethyl-3,3-diphenyltrisiloxane.

The 1,1,5,5-tetrahydrogeno-1,5-dimethyl-3,3-diphenyltrisiloxane employed as starting material is prepared as follows. Into a 2-litre, round-bottomed flask provided with a stirrer, a supply funnel, a condenser cooled by a current of chilled brine and a thermometer, are introduced: 253 g. of diphenyldichlorosilane (1 mole); 241.5 g. of methylchlorosilane (3 moles); and 500 g. of diethyl ether. The flask is cooled to −5° C. by a brine bath, and 500 g. of water are added with stirring in 1 hour, 15 minutes, the temperature being kept between −5° C. and +5° C. The mixture is allowed to return to ambient temperature (20° C.) and then heated under reflux (about 40° C.) for 30 minutes. The aqueous hydrochloric acid solution is separated and the ethereal layer is washed to neutrality with 3 × 250 cc. of water and dried over sodium sulphate. The ether is then eliminated under normal pressure and the residue is fractionally distilled in vacuo. 232 g. of 1,1,5,5-tetrahydrogen-1,5-dimethyl-3,3-diphenyltrisiloxane are thus obtained, B.P. 106–107° C./1 mm. Hg, $n_D^{20}=1.5140$, $d_4^{20}=1.021$. The yield, based on the initial diphenyldichlorosilane, is 76%.

EXAMPLE 7

The procedure of Example 6 is followed, the methanol being replaced by 180 g. of anhydrous ethanol (the theoretical quantity is 120.8 g.). After elimination of the excess of ethanol and N,N-diethylhydroxylamine, followed by fractional distillation, 246 g. of 1,1,5,5-tetraethoxy-1,5-dimethyl-3,3-diphenyltrisiloxane distilling at 145° C. under 0.2 mm. Hg are obtained, $d_4^{20}=1.040$, $n_D^{20}=1.4720$.

The following compounds may be prepared in the same way: 1,1,5,5-tetramethoxy-1,5-diethyl-3,3-diphenyltrisiloxane; 1,1,5,5-tetraethoxy-1,5-diethyl-3,3-diphenyltrisiloxane; and 1,1,5,5-tetramethoxy-1,3,3,5-tetraphenyltrisiloxane.

EXAMPLE 8

73.5 g. of $CH_3SiH(OC_2H_5)_2$ are introduced into the same apparatus as described in Example 6, and with the same precautions. A solution consisting of 54 g. of diphenylsilanediol, 2 g. of N,N-diethylhydroxylamine and 350 cc. of anhydrous diethyl ether is added in one hour with stirring and cooling with a mixture of water and ice. The stirring is continued until the evolution of hydrogen ceases, i.e., for 3 hours, and the absence of Si—H bonds in the reaction mixture is then checked by titration.

After elimination of the solvent, N,N-diethylhydroxylamine, and excess of $CH_3SiH(OC_2H_5)_2$, the product is fractionally distilled in vacuo and a liquid (75 g.) having the same characteristics as the product of Example 7 is collected at 145° C. under 0.2 mm. Hg.

In the same way 1,1,5,5-tetramethoxy-1,5-dimethyl-3,3-diphenyltrisiloxane may be prepared from methyldimethoxysilane; 1,1,5,5-tetramethoxy-1,5-diethyl-3,3-diphenyltrisiloxane may be prepared from ethyldimethoxysilane; and 1,1,5,5-tetraethoxy-1,3,3,5-tetraphenyltrisiloxane may be prepared from phenyldiethoxysilane.

EXAMPLE 9

Mixtures comprising a diorganopolysiloxane gum having a viscosity of 20 million centipoises at 25° C. (100 g.), silica of combustion having a large specific surface (300 m.²/g.) treated with octamethylcyclotetrasiloxane (56 g.), and, as plasticiser, 1,1,5,5-tetramethoxy-1,5-dimethyl-3,3-diphenyltrisiloxane (0, 2, 3, or 4 g.) are prepared on roll-type mixers. These mixers are allowed to stand for 15 days and are then taken up to be replasticised and then to incorporate 2,4-dichlorobenzoyl peroxide therein. This peroxide is used in the form of a 50% paste in a silicone oil, in a proportion of 1.25 part of solution to 100 parts of mixture. After replasticisation, followed by addition of the peroxide, the mixtures are vulcanised in moulds 2 mm. deep, by heating for 10 minutes at 125° C., and part of the products obtained are then cured by heating for 16 hours in an oven at 250° C. ventilated with hot air. The following mechanical measurements are made on the various sheets obtained: Shore hardness A [ASTM Standard D676–59T]; breaking strength (RR) [Afnor Standard T46002 (dumbbells H3)]; Elongation percent [Afnor Standard T46002 (dumbbells H3)]; and tearing strength (RD) [ASTM Standard D624–54T (test piece "A")]. These tests give the following results:

| Quantity of plasticiser (g.) | Replasticisation time | Mechanical properties | | | | | | | |
|---|---|---|---|---|---|---|---|---|---|
| | | After vulcanisation | | | | After curing | | | |
| | | Shore Hardness A | RR (kg./cm.²) | A, percent | RD (kg./cm.) | Shore Hardness A | RR (kg./cm.²) | A, percent | RD (kg./cm.) |
| 0 | 2 minutes | 65 | 85 | 330 | 18 | 73 | 65 | 195 | 13 |
| 2 | 45 seconds | 57 | 87 | 455 | 27 | 72 | 83 | 285 | 18.5 |
| 3 | 40 seconds | 60 | 83 | 472 | 24 | 72 | 83 | 305 | 19.5 |
| 4 | 30 seconds | 62 | 80 | 495 | 25 | 75 | 82 | 305 | 20 |

The diorganopolysiloxane gum employed may be prepared by polymerisation of a mixture consisting of 99.67% by weight of octamethylcyclotetrasiloxane, 0.23% of tetramethyltetravinylcyclotetrasiloxane and 0.1% of a chain limiter of the hexamethyldisiloxane type, the polymerisation being carried out in the presence of potassium hydroxide, with subsequent stabilisation with a small quantity of silica of combustion, followed by removal of volatile materials.

EXAMPLE 10

Mixtures are prepared in the same way as those of Example 9, the plasticiser being replaced by 1,1,5,5-tetraethoxy-1,5-dimethyl-3,3-diphenyltrisiloxane. After storage for 15 days, the product is replasticised, peroxide is added and the product is vulcanised and cured as in Example 9. The usual mechanical measurements are then made, and the following results are obtained:

| Quantity of plasticiser (g.) | Replasticisation time | Mechanical properties | | | | | | | |
|---|---|---|---|---|---|---|---|---|---|
| | | After vulcanisation | | | | After curing | | | |
| | | Shore Hardness A | RR (kg./cm.²) | A, percent | RD (kg./cm.) | Shore Hardness A | RR (kg./cm.²) | A, percent | RD (kg./cm.) |
| 0 | 2 minutes | 65 | 85 | 330 | 18 | 73 | 65 | 195 | 13 |
| 2 | 1 minute, 15 seconds | 60 | 79 | 415 | 26 | 71 | 84 | 315 | 22 |
| 3 | 55 seconds | 60 | 76 | 450 | 26 | 72 | 80 | 300 | 20 |
| 4 | 40 seconds | 58 | 72.5 | 485 | 28 | 74 | 81.5 | 295 | 17.5 |

I claim:

1. Process for the preparation of an organosiloxane which comprises reacting an organosilicon compound containing in each molecule one or two hydrogen atoms directly attached to silicon, the remaining substituents of the silicon atoms being lower alkyl, lower alkenyl, lower alkoxy or phenyl, with an organosilanol of the formula:

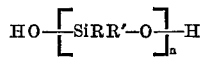

in which $n$ is an integer and R and R' are the same or different and are each lower alkyl, lower alkenyl, or phenyl, in the presence of, as catalyst, hydroxylamine, an N-(lower alkyl)hydroxylamine, or an N,N-di(lower alkyl)hydroxylamine.

2. Process according to claim 1 in which the organosilicon compound containing hydrogen atoms directly bound to silicon has the formula:

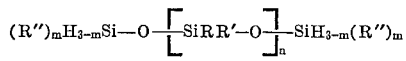

in which $m$ is 1 or 2, $n$ is an integer, and R, R' and R" are the same or different and are each lower alkyl, lower alkenyl or phenyl.

3. Process for the production of an organosiloxane of the formula:

which comprises reacting diphenylsilanediol with a compound of the formula:

where R is lower alkyl and R' is lower alkyl or phenyl, in the presence of, as catalyst, hydroxylamine, an N-(lower alkyl)hydroxylamine, or an N,N-di(lower alkyl)hydroxylamine.

4. Process according to claim 1 in which the catalyst is N,N-diethylhydroxylamine.

5. Process according to claim 3 in which the catalyst is N,N-diethylhydroxylamine.

6. Process according to claim 1 in which the proportion of catalyst is 0.1 to 5% of the total weight of the organosilicon compounds.

7. Process according to claim 3 in which the proportion of catalyst is 0.1 to 5% of the total weight of the organosilicon compounds.

References Cited

UNITED STATES PATENTS 2,815,300  12/1957  Smith _____ 117—103 XR
2,967,171  1/1961   Barnes et al. ____ 260—46.5 XR
3,085,934  4/1963   Vierling _____ 167—53 XR
3,161,614  12/1964  Brown et al. ____ 260—46.5 XR TOBIAS E. LEVOW, Primary Examiner J. P. PODGORSKI, Assistant Examiner U.S. Cl. X.R.

260—46.5, 448.8